United States Patent
Bui et al.

(10) Patent No.: US 6,717,594 B1
(45) Date of Patent: Apr. 6, 2004

(54) DATA PROCESSING SYSTEM AND METHOD FOR DISPLAYING A GRAPHICAL DEPICTION OF SYSTEM CONFIGURATION

(75) Inventors: Tam D. Bui, Austin, TX (US); George John Dawkins, Austin, TX (US); Van Hoa Lee, Cedar Park, TX (US); Jayeshkumar M. Patel, Austin, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 09/668,549

(22) Filed: Sep. 25, 2000

(51) Int. Cl.[7] .......................... G06T 15/00; G09G 5/00; G06F 15/177
(52) U.S. Cl. .................. 345/763; 345/501; 345/522; 345/965; 709/221; 709/222; 713/1; 713/2
(58) Field of Search ................ 345/418, 501, 345/522, 213, 734–736, 764, 774, 440, 619, 961, 965, 970, 763; 700/1, 83, 90, 95, 115–117, 184; 702/108; 709/1, 100, 310, 221–223; 713/1, 2, 300, 100; 716/4; 717/174, 124; 703/21

(56) References Cited

U.S. PATENT DOCUMENTS

| | | | | |
|---|---|---|---|---|
| 4,888,771 A | * | 12/1989 | Benignus et al. | 714/26 |
| 5,305,437 A | * | 4/1994 | Fritze et al. | 345/520 |
| 5,487,656 A | * | 1/1996 | Kaitanjian | 713/2 |
| 5,504,904 A | * | 4/1996 | Dayan et al. | 713/1 |
| 5,627,955 A | * | 5/1997 | Gnirss et al. | 345/441 |
| 5,963,191 A | * | 10/1999 | Jaaskelainen, Jr. | 345/856 |
| 6,463,531 B1 | * | 10/2002 | Aguilar et al. | 713/2 |
| 6,487,656 B1 | * | 11/2002 | Kim et al. | 713/2 |

* cited by examiner

*Primary Examiner*—Matthew C. Bella
*Assistant Examiner*—Wesner Sajous
(74) *Attorney, Agent, or Firm*—Mark E. McBurney; Bracewell & Patterson, L.L.P.

(57) ABSTRACT

A data processing system and method are disclosed for displaying a graphical depiction of the system configuration of the data processing system. Execution of a boot process of the data processing system is started. Prior to a completion of the boot process, a configuration of the data processing system is determined by the system itself. A graphical depiction of the configuration is then generated. The graphical depiction is then graphically displayed utilizing a display screen which is included in the data processing system. The graphical depiction illustrates each device included in the system as well as how the devices are interconnected. Thereafter, the execution of the boot process is completed. The steps of determining a configuration, generating a graphical depiction, and graphically displaying the graphical depiction are completed prior to completing the booting the data processing system, and thus prior to an operating system being executed by the data processing system.

2 Claims, 3 Drawing Sheets

DATA PROCESSING SYSTEM AND METHOD FOR DISPLAYING A GRAPHICAL DEPICTION OF SYSTEM CONFIGURATION

BACKGROUND OF THE INVENTION

1. Field of the Invention

The present invention relates in general to data processing systems and, in particular, to a data processing system and method for displaying a graphical depiction of the configuration of the system. Still more particularly, the present invention relates to a data processing system and method for determining a configuration of the system and graphically displaying a graphical depiction of the configuration prior to a completion of the booting of the system.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Current computer systems, including personal computers and other types of computer systems, generate a system configuration listing. The system configuration listing provides a list of the devices coupled to the computer system. The list identifies each device and identifies the port to which the device is coupled. However, the system configuration listing cannot be used to quickly determine the overall configuration of the system. It is difficult to use to determine how the nodes of a data processing system are interconnected. As used herein, the term "node" means a type of input/output (I/O) expansion tower. An expansion tower is a device which is utilized to couple additional I/O devices to a computer system. The expansion tower is utilized to hold adaptor cards which are inserted into the tower and which are coupled to I/O devices.

Therefore a need exists for a data processing system and method for graphically displaying a graphical depiction of the configuration of the system to permit a user to quickly and easily ascertain how the devices of the system are interconnected.

SUMMARY OF THE INVENTION

A data processing system and method are disclosed for displaying a graphical depiction of the system configuration of the data processing system. Execution of a boot process of the data processing system is started. Prior to a completion of the boot process, a configuration of the data processing system is determined by the system itself. A graphical depiction of the configuration is then generated. The graphical depiction is then graphically displayed utilizing a display screen which is included in the data processing system. The graphical depiction illustrates each device included in the system as well as how the devices are interconnected. Thereafter, the execution of the boot process is completed. The steps of determining a configuration, generating a graphical depiction, and graphically displaying the graphical depiction are completed prior to completing the booting the data processing system, and thus prior to an operating system being executed by the data processing system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
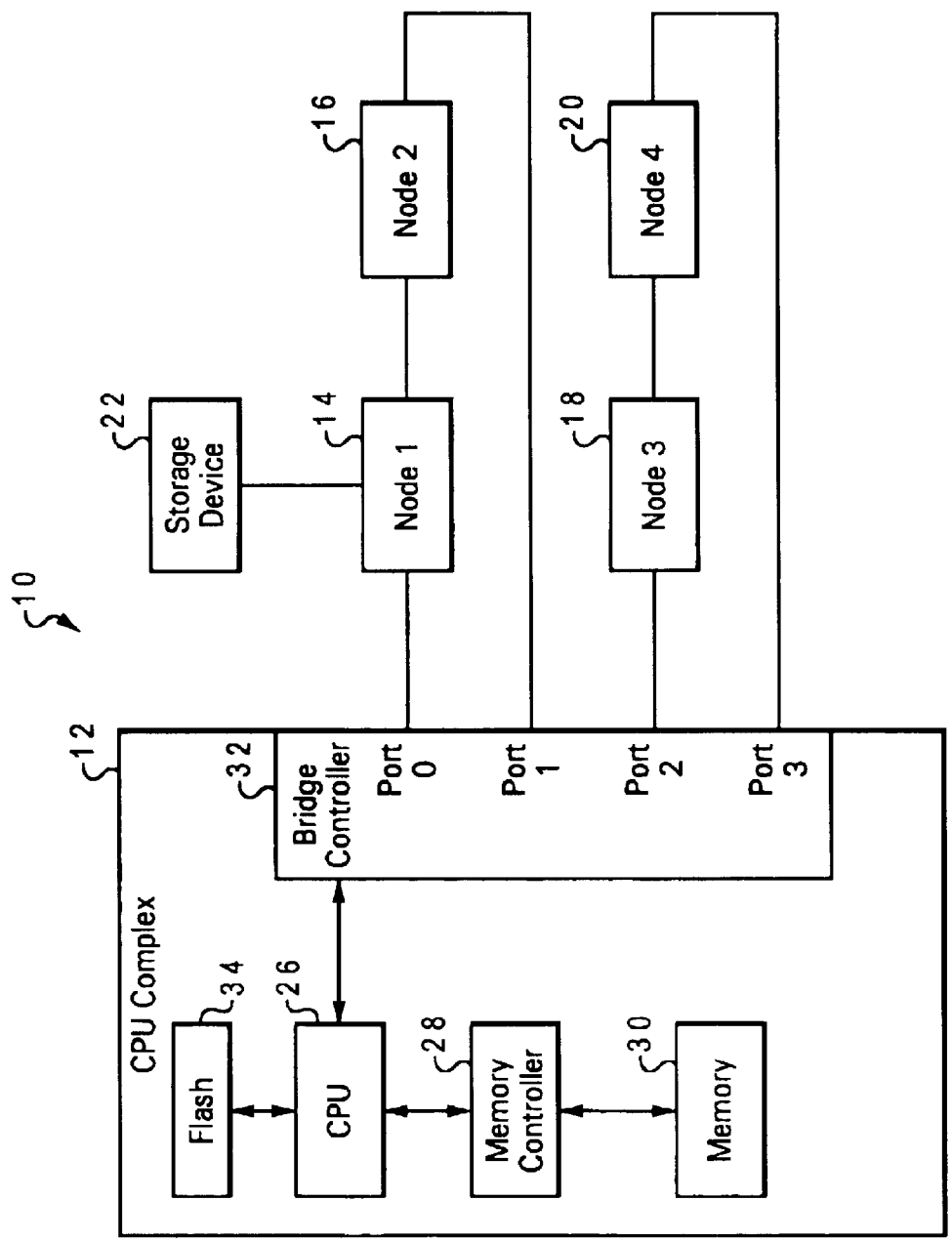
FIG. 1 illustrates a block diagram of a data processing system 10 including a plurality of nodes and is also a graphical depiction of the configuration which may be displayed to a user in accordance with the method and system of the present invention.
Figure 2:
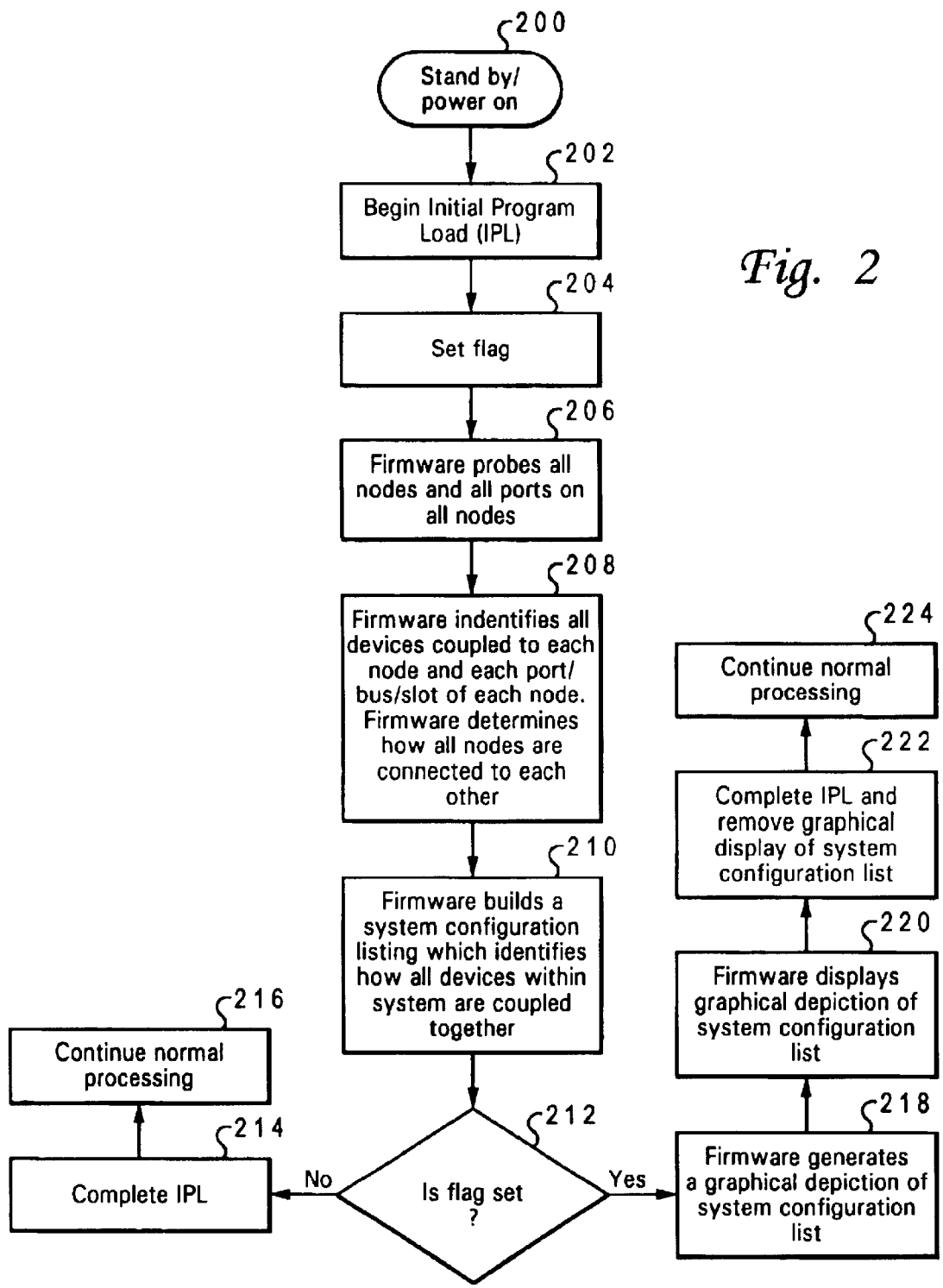
FIG. 2 depicts a high level flow chart which illustrates generating the graphical display, depicted in FIG. 1, of the configuration of the data processing system in accordance with the method and system of the present invention.
Figure 3:
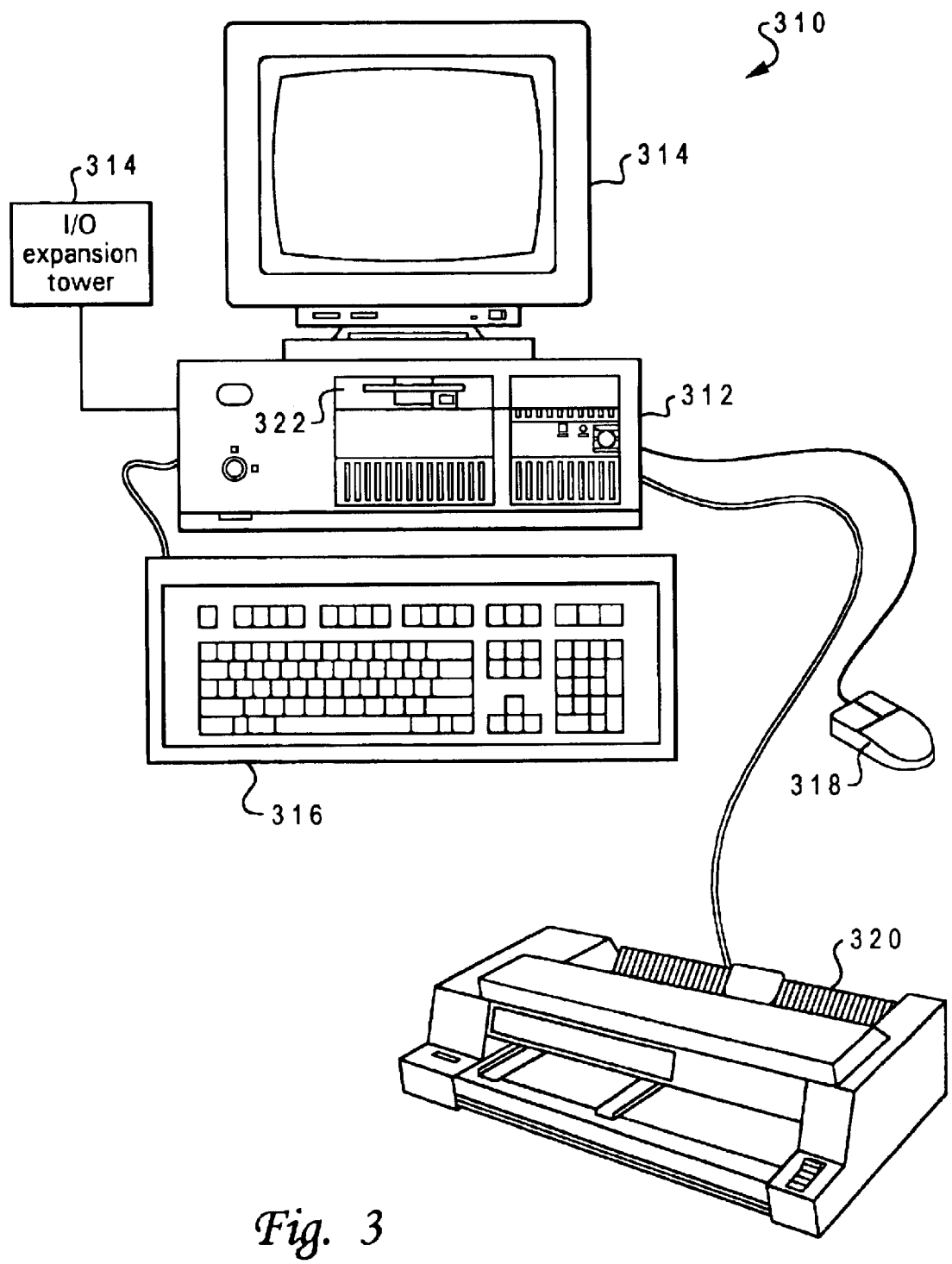
FIG. 3 illustrates a pictorial representation of a computer system which is included in the data processing system of FIG. 1 in accordance with the method and system of the present invention.

A preferred embodiment of the present invention and its advantages are better understood by referring to FIGS. 1–3 of the drawings, like numerals being used for like and corresponding parts of the accompanying drawings.

The present invention is a method and system for generating and displaying a graphical depiction of the system configuration of a data processing system. The data processing system will typically include a computer system which is coupled to multiple nodes and/or devices. The nodes may also be coupled to other nodes and/or other devices. The present invention generates a graphical layout of all of the nodes and devices and how these nodes and devices are interconnected.

The computer system begins the process of booting, called an Initial Program Load (IPL). Prior to completing the IPL, the computer system will generate a system configuration listing which identifies all nodes and devices of the data processing system within which this computer system is included. The system configuration also identifies how the nodes and devices of the data processing system are interconnected.

A graphical depiction of the configuration is then generated and graphically displayed on a display screen which is included in the computer system. The execution of the boot process is then completed.

The present invention provides a graphical view of the system configuration which is easy to read and quickly understood. A user does not need to check all of the physical connections manually in order to figure out how the system is interconnected. The present invention gives an immediate view of the system configuration. In addition, the present invention displays the system configuration prior to an operating system being executed by the computer system.

FIG. 1 illustrates a graphical depiction of a system configuration of a data processing system 10 including a plurality of nodes in accordance with the method and system of the present invention. Further, FIG. 1 is a graphical depiction of the configuration which may be displayed to a user. The present invention will graphical display FIG. 1.

Data processing system 10 includes a CPU complex 12 which is included within a computer system such as depicted by FIG. 3. CPU complex 12 includes a CPU 26 which is connected by address, control, and data busses to a memory controller 28 and a bridge controller 32. Memory controller 28 is coupled to a system memory 30. Bridge controller 32 includes a plurality of ports, such as port 0, port 1, port 2, and port 3. These ports are utilized to couple CPU complex 12 to other nodes. For example, port 0 is coupled directly to node 1.

A flash memory 34 is coupled to CPU 26. The firmware, described below is located in flash 34. In addition, a flag is included in flash 34 which indicates whether a graphical depiction of the system configuration is to be displayed.

Any or all of the nodes may be coupled to additional devices. For example, node 14 may be coupled to a storage device 22. All of the devices coupled to the nodes of the data processing system will be included in the graphical depiction.

FIG. 2 depicts a high level flow chart which illustrates generating the graphical display, depicted in FIG. 1, of the configuration of the data processing system in accordance with the method and system of the present invention. The process starts as depicted at block 200 and thereafter passes to block 202 which illustrates firmware included in flash 34 in a computer 312 (shown in FIG. 3) beginning the execution of the Initial Program Load (IPL). The IPL process is commonly referred to as "booting" computer 312. Thereafter, block 204 depicts setting a flag. The flag is used to indicate whether a graphical depiction of the configuration of data processing system 10 will be displayed. The flag is stored in flash 34. Next, block 206 illustrates the firmware probing all ports in CPU complex 12 to determine which nodes are coupled to these ports. In addition, each port on each node coupled to the ports of CPU complex 12 is probed to determine what is coupled to each port within each node. The process then passes to block 208 which depicts the firmware identifying all devices which are coupled to each node coupled to the ports of CPU complex 12, and each port, bus, and/or slot of each node coupled to the ports of CPU complex 12. In addition, the firmware determines how all nodes are connected to each other.

Thereafter, block 210 illustrates the firmware building a system configuration listing which identifies all devices within data processing system 10 and how these devices are coupled together. The system configuration listing includes all information determined depicted by blocks 206 and 208. The process then passes to block 212 which illustrates a determination of whether or not the flag is set. When the flag is set, a graphical depiction of the system configuration will be graphically displayed on a monitor 314 (shown in FIG. 3). When the flag is not set, no graphical depiction will be displayed. However, even when the flag is not set, the system configuration listing will be generated during the booting of the computer 312.

Referring to block 212, if a determination is made that the flag is not set, the process passes to block 214 which depicts the completion of the execution of the IPL. This, then, completes the booting of computer 312. The process then passes to block 216 which illustrates the continuation of normal processing.

Referring again to block 212, if a determination is made that the flag is set, the process passes to block 218 which depicts the firmware generating a graphical depiction of the system configuration list which was built as illustrated by block 210. The process then passes to block 220 which depicts the firmware graphically displaying the graphical depiction of the system configuration list on monitor 314. The graphical depiction illustrates each device included in the system, and graphically depicts each device in a manner to graphically indicate the interconnection of the devices. Next, block 222 illustrates the completion of the IPL which completes the booting of computer 312. The graphical depiction is then removed from monitor 314 at the completion of the boot process. Thereafter, block 224 depicts the continuation of normal processing.

FIG. 3 illustrates a pictorial representation of a computer system which is included in the data processing system of FIG. 1 in accordance with the method and system of the present invention. Computer system 310 includes a computer 312, a display screen 314, a keyboard 316, a mouse 318, a printer or plotter 320, and a floppy disk drive 322.

Computer system 310 may be coupled to a node, also called an I/O expansion tower, 314. Expansion tower 314 may include multiple adaptors which may be coupled to additional devices. The present invention will probe each node, or expansion tower, to determine which adaptors, if any are included within the tower. Each device coupled to the tower will also be determined. All of these towers along with any adaptors included within the towers and the devices coupled to the adaptors will be graphically depicted as part of the data processing system. The graphical depiction will graphically indicate the presence of each tower/adaptor/device and how all of the towers/adaptors/devices are interconnected.

CPU complex 12 is included within computer 312. The process described above of executing the IPL occurs within computer 312 in order to boot computer 312.

Computer system 310 may be implemented utilizing any commercially available computer system which has been suitably programmed and which has been modified as described above. Although a personal computer is depicted in FIG. 3, any type of computer may be utilized. Computer system 310 is capable of receiving a variety of different types of inputs from a variety of different types of input devices. Keyboard 316 and mouse 318 are two such types of input devices.

While a preferred embodiment has been particularly shown and described, it will be understood by those skilled in the art that various changes in form and detail may be made therein without departing from the spirit and scope of the present invention.

What is claimed is:

1. A method for configuring a data processing system, said method comprising:

starting execution of a boot process to boot a data processing system;

determining a configuration of said data processing system;

establishing a flag in said data processing system for indicating whether to display a graphical depiction of said configuration;

determining whether said flag is set;

in response to a determination that said flag is not set, completing execution of said boot process without determining said configuration of said data processing system, generating a graphical depiction of said configuration, or graphically displaying said graphical depiction; and in response to a determination that said flag is set, executing said configuration of said data processing system, generating a graphical depiction of said configuration of said data processing system, and graphically displaying said graphical depiction prior to completing execution of said boot process, wherein said steps of determining a configuration of said data processing system, generating said graphical depiction of said configuration, and graphically displaying said graphical depiction are completed prior to booting said data processing system and prior to said data processing system executing an operating system.

2. A data processing system comprising:

means for starting execution of a boot process to boot said data processing system;

means for determining a configuration of said data processing system;

a flag included in said data processing system for indicating whether to display a graphical depiction of said configuration of said data processing system;

means for, determining whether said flag is set;

means for, in response to a determination that said flat is not set, completing execution of said boot process without determining said configuration of said data processing system, generating a graphical depiction of said configuration of said data processing system, or graphically displaying said graphical depiction; and means for, in response to a determination that said flag is set, determining said configuration of said data processing system, generating said graphical depiction of said configuration of said data processing system, and graphically displaying said graphical depiction prior to completing execution of said boot process in response to a determination that said flag is set, wherein said determining said configuration of said data processing system, said generating of said graphical depiction of said configuration, and said graphically displaying said graphical depiction are completed prior to booting said data processing system and prior to said data processing system executing an operating system.

* * * * *